J. R. WALKER.
EYE PROTECTOR.
APPLICATION FILED MAR. 13, 1919.
1,307,223.
Patented June 17, 1919.
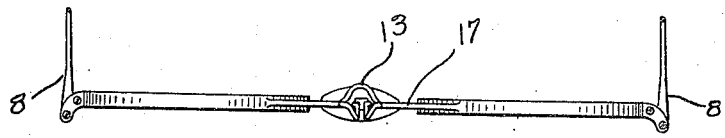
Fig. 1
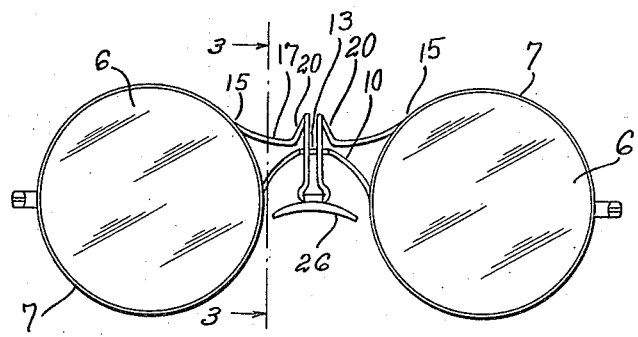
Fig. 2
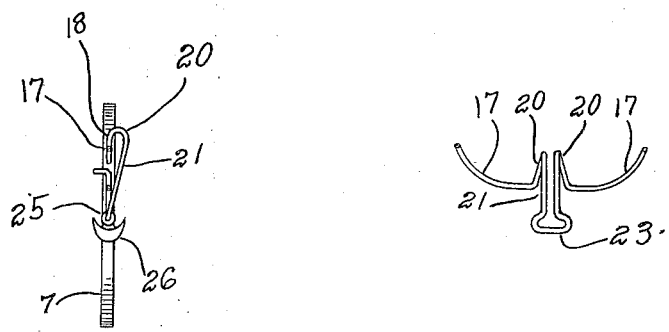
Fig. 3
Fig. 4
Inventor.
John R. Walker,
By Horatio E. Bellows,
Attorney.

UNITED STATES PATENT OFFICE.

JOHN R. WALKER, OF PROVIDENCE, RHODE ISLAND.

EYE-PROTECTOR.

1,307,223. Specification of Letters Patent. Patented June 17, 1919.

Application filed March 13, 1919. Serial No. 282,357.

*To all whom it may concern:*

Be it known that I, JOHN R. WALKER, a citizen of the United States, residing at Providence, in the county of Providence and State of Rhode Island, have invented certain new and useful Improvements in Eye-Protectors, of which the following is a specification.

My invention relates to eye protectors and particularly to that class of spectacles or goggles which have bridges or lens connections of pliable material.

The essential objects of my invention are to insure sufficient rigidity in the yieldable lens connection to insure the required stability of position after adjustment; to permit universal adjustment of the lenses relatively to the nose rest and the eyes of the wearer; and to attain these ends in a simple, inexpensive, and easily operated structure.

To the above ends essentially my invention consists in such parts and in such combinations of parts as fall within the scope of the appended claims.

In the accompanying drawings which form a part of this specification—

Figures 1 and 2, are a plan and a front elevation respectively of my improved structure, Fig. 3, a section on line 3—3 of Fig. 2, and Fig. 4, a front elevation of saddle or nose rest supporting portion.

Like reference charcters indicate like parts throughout the views.

In the drawings 6 represents the lenses, 7 the rims, and 8 the temples of an eye protector or goggles. The bridging or lens connecting members comprise an arched brace 10 of pliable material fast at its ends to the rims 7 and a central rearwardly directed open loop 13. The second bridging member, of similar material is formed from a wire or strip starting as at points 15 upon the rims above the bridge. The ends of the strip are fast to the lenses and extend downwardly and inwardly and then upwardly to form supporting portions 17 whence the material extends upwardly and then forwardly and downwardly forming two parallel vertical transversely disposed loops 20. The material of the strips is continued downwardly and slightly rearwardly forming depending parallel arm portions 21 joined at their lower ends by an oblong horizontal loop 23, loose upon which is a sleeve 25 upon the central portion of the back of an arched transversely curved nose rest, 26.

It will be observed that both bridge connecting members have a maximum of material so bent at to afford means for great limits of adjustment of the lenses toward and from each other, and up and down; that the loop 13 affords a stiffening effect to the arch 10; and that the loops 20 are so disposed relatively to the depending nose piece and to the plane of the lenses that the latter are movable relatively to nose piece not only upwardly, downwardly, and both directions laterally, but by further manipulation of said loops with the pliers the lenses are adjustable to any conceivable plane or planes. It will be further noted that accuracy of seating is insured by the pivotal connection of the nose rest with the loop 23.

I claim:

1. An eye protector including lens rims, an arched member connecting the rims, and a second connecting member located adjacent the first member comprising supporting portions adjacent its ends, vertical loops disposed transversely to the vertical plane of the rims, and parallel arms depending from the loops, and a nose rest supported by the arms.

2. An eye protector including lens rims, a member connecting the rims, a second rim connecting member located above the first member, comprising downwardly inclined supporting portions adjacent its ends, parallel vertical loops at the inner ends of the supporting portions, and arms depending from the loops, and a nose rest supported by the arms.

3. An eye protector including lens rims, an arched member connecting the rims, a transverse loop in the arch, a connecting member upon the rims above the first member comprising horizontal portions, depending arms between the horizontal portions extending below the loop and adjacent thereto, and a loop connecting the ends of the arms, and a nose rest upon the second loop.

4. An eye protector including lens rims, a member connecting the rims, a second connecting member above the first member comprising substantially parallel arms depending from its middle portion and extending below the first member, and a horizontally disposed loop connecting the lower ends of the arms, and a nose rest journaled on the loop.

In testimony whereof I have affixed my signature.

JOHN R. WALKER.

Copies of this patent may be obtained for five cents each, by addressing the "Commissioner of Patents, Washington, D. C."